United States Patent
Holopainen et al.

(10) Patent No.: US 9,018,827 B2
(45) Date of Patent: Apr. 28, 2015

(54) END SHIELD FOR AN ELECTRICAL MACHINE HAVING COPLANAR BRACKETS AND BEARING OPENING

(75) Inventors: Timo Holopainen, Espoo (FI); Tia Tuhkanen, Vantaa (FI)

(73) Assignee: ABB Technology AG, Zürich (CH)

( * ) Notice: Subject to any disclaimer, the term of this patent is extended or adjusted under 35 U.S.C. 154(b) by 0 days.

(21) Appl. No.: 13/409,149

(22) Filed: Mar. 1, 2012

(65) Prior Publication Data
US 2012/0217848 A1    Aug. 30, 2012

Related U.S. Application Data

(63) Continuation of application No. PCT/FI2010/050681, filed on Sep. 1, 2010.

(51) Int. Cl.
| | | |
|---|---|---|
| H02K 5/15 | (2006.01) | |
| H02K 5/16 | (2006.01) | |
| H02K 7/08 | (2006.01) | |
| H02K 5/06 | (2006.01) | |
| H02K 5/167 | (2006.01) | |
| H02K 5/173 | (2006.01) | |

(52) U.S. Cl.
CPC .. *H02K 5/15* (2013.01); *H02K 5/06* (2013.01); *H02K 5/1672* (2013.01); *H02K 5/1732* (2013.01)

(58) Field of Classification Search
CPC ............. H02K 7/08; H02K 5/04; H02K 5/15; H02K 5/16
USPC ............................. 310/401–417, 400, 89, 91
IPC ............................. H02K 7/08, 5/04, 5/15, 5/16
See application file for complete search history.

(56) References Cited

U.S. PATENT DOCUMENTS

| | | | | |
|---|---|---|---|---|
| 3,833,276 | A * | 9/1974 | Baumann et al. | 310/90 |
| 4,528,469 | A * | 7/1985 | Prenner et al. | 310/89 |
| 5,001,377 | A * | 3/1991 | Parkinson | 310/90 |
| 5,322,373 | A * | 6/1994 | Oakes et al. | 384/462 |
| 5,327,036 | A * | 7/1994 | Carey | 310/89 |
| 5,914,551 | A * | 6/1999 | Kern et al. | 310/91 |
| 6,157,115 | A * | 12/2000 | Hassler, Jr. | 310/328 |
| 6,376,950 | B1 | 4/2002 | Varney et al. | |
| 2005/0231053 | A1 * | 10/2005 | Okamoto et al. | 310/90 |

* cited by examiner

FOREIGN PATENT DOCUMENTS

| | | |
|---|---|---|
| EP | 0120279 A1 | 10/1984 |
| EP | 1587204 A2 | 10/2005 |
| GB | 492434 A | 9/1938 |

OTHER PUBLICATIONS

International Search Report (PCT/ISA/210) issued on Oct. 27, 2011, by European Patent Office as the International Searching Authority for International Application No. PCT/FI2010/050681.

*Primary Examiner* — Michael Andrews
(74) *Attorney, Agent, or Firm* — Buchanan Ingersoll & Rooney PC (57) ABSTRACT

In an arrangement in an electrical machine, the electrical machine includes a rotor rotating around its shaft, a stator located from the rotor at an air gap, and a frame around the outer surface of the stator. A stator opening is formed in the end of the frame, and the stator opening is closeable with a cast end shield. The end shield includes at least three brackets protruding from the outer edge of the end shield. The brackets are fittable onto the end junctions where axially continuing structures are connected to the end at the junctions.

20 Claims, 7 Drawing Sheets

END SHIELD FOR AN ELECTRICAL MACHINE HAVING COPLANAR BRACKETS AND BEARING OPENING

RELATED APPLICATION(S)

This application claims priority as a continuation application under 35 U.S.C. §120 to PCT/FI2010/050681, which was filed as an International Application on Sep. 1, 2010 designating the U.S., and which claims priority to Finnish Application 20095895 filed in Finland on Sep. 1, 2009 and Finnish Application 20096011 filed in Finland on Oct. 2, 2009. The entire contents of these applications are hereby incorporated by reference in their entireties.

FIELD

The disclosure relates to a cast end shield for an electrical machine and an electrical machine.

BACKGROUND INFORMATION

An end shield is a standard structure that can be included in electrical machines. The end shield closes the opening at an end of a frame of an electrical machine through which a stator can be installed into the frame. The end shield can also serve as an attachment base for bearings supporting the rotor. It can transfer the rotor's supporting forces to the frame of the electrical machine.

The end shield can protect electrical and rotating parts of the electrical machine and serve as a structure supporting the bearing. These can impose several functional specifications, on the end shield such as stiffness and a small axial space. Furthermore, the end shield should be competitive in terms of manufacturing costs.

A purpose of the end shield can be to support the bearing, which in turn can support the rotor. Stiff support of the rotor can enable increased specified rotational speeds and reduce vibration levels of the bearings. Stiff support of the rotor can be achieved through radial support. The stiffness of radial support can be affected by radial and rotational stiffness of the end shield. The latter refers to the shield's ability to receive a bending moment, represented by a vector in a same plane as the shield and transmitted by the bearing, without substantial rotation.

Axial stiffness of the end shield and the frame end is desirable in vertical machines in which a mass of the rotor and an axial load from the machine can be transferred to the frame of the electrical machine through the end shield and the frame end. The axial stiffness of the end shield and the frame end can also affect a natural frequency of axial mode of the frame end. The frequency, in turn, is closely related to vibration levels of the bearings.

A small axial space specification is desirable for the end shield. It can be desirable to achieve the shortest possible bearing span in relation to the axial space reserved for active components (for example, stator, windings, stator connection and air insulation). The space specification of the end shield can be measured by a distance between a plane perpendicular to the axial direction touching an air insulation space and a parallel plane intersecting a middle plane of the bearing. The vertical plane, perpendicular to the axial direction and touching the air insulation space, is determined to be in the location where the air insulation space is completely on the stator side. The axial middle plane of the bearing can be the symmetry plane of the rolling or sliding elements. The space specification of the end shield is considered for two-pole stiff shaft electrical machines in which a specified rotational speed is to be kept above the operating rotational speed.

Known end shields of large electrical machines have been manufactured from thick steel sheet by machining. An advantage of a machined steel shield is its economic efficiency, as a factor affecting the price is the thickness of the steel shield. However, a bending stiffness of a steel sheet of uniform thickness is poor in relation to its weight. Furthermore, a local stiffness of the bearing attachment is determined by the thickness of the end shield. Thus, general bending stiffness and the local stiffness of the attachment can be improved, by increasing the thickness of the end shield. On the other hand, increasing the thickness of the end shield can increase the material costs as well as the axial space requirement of the end shield within the electrical machine.

The bending stiffness of a steel shield can also be increased by reinforcements, for example by welding external reinforcements onto the shield. This introduces new stages of end shield manufacture and creates more costs. Furthermore, in the placement of the reinforcements, the functional specification for the end shield—as well as factors affecting its appearance—should be considered.

Cast shields can be used in small electrical machines. A cast shield enables the optimization of the features by design. Heat transfer has a role in the design of a cast shield. The support stiffness for small electrical machines does not usually cause problems. Cast shields are rare with larger electrical machines due to the short production runs.

SUMMARY

A cast end shield is disclosed for an electrical machine, for closing a stator opening formed in an end of a frame and for supporting a bearing that is to support a rotor, the end shield comprising an opening in a middle for a bearing supporting a shaft of a rotor, an inner rim limited by the opening, a further rim connecting to the inner rim, the further rim extending up to an outer edge of the end shield, and at least three brackets protruding from the outer edge of the end shield to the radial direction, the brackets being fitted for an electrical machine frame end.

An electrical machine is disclosed, comprising: a rotor for rotating around a shaft; a stator spaced from the rotor at an air gap; a frame around an outer surface of the stator, a stator opening being formed in an end of the frame; and a cast end shield for closing the stator opening wherein the end shield comprises: at least three brackets protruding from an outer edge of the end shield, the brackets being fittable onto end junctions where axially continuing structures are connected to the frame end at the junctions.

BRIEF DESCRIPTION OF THE DRAWINGS

In the following, the disclosure will be described in more detail with the regard to exemplary embodiments by referring to the enclosed drawings, where.

DETAILED DESCRIPTION

The present disclosure relates to a cast end shield for an electrical machine, an arrangement in an electrical machine, and an electrical machine, where the end shield is lightweight, and the end shield as well as the frame end of the electrical machine are stiff.

A cast end shield for an electrical machine according to an exemplary embodiment of the disclosure can close a stator opening formed in the frame end of an electrical machine. The end shield can support a bearing that supports a rotor. The end shield includes an opening in the middle for the bearing that supports the rotor shaft, and an inner rim limited by the opening, and a further rim connecting to the inner rim. The further rim extends up to an outer edge of the end shield. The end shield includes at least three brackets protruding in a radial direction from the outer edge of the end shield, and the brackets are fittable to the end.

In the arrangement according to an exemplary embodiment the disclosure, the electrical machine includes a rotor for rotating around its axis, a stator spaced from the rotor at an air gap, and a frame located around an outer surface of the stator. A stator opening is formed in the frame end. The opening is closeable with a cast end shield. The end shield includes at least three brackets protruding from the outer edge of the end shield. The brackets are fittable to the frame end in junctions, where axially continuing structures are connected to the frame end at the junctions.

In an electrical machine according to an exemplary embodiment of the disclosure, the electrical machine includes a rotor rotating around its axis, a stator spaced from the rotor at an air gap, and a frame located around the outer surface of the stator. A stator opening is formed in the frame end. The opening is closeable with a cast end shield. The end shield includes at least three brackets protruding from the outer edge of the end shield. The brackets are fitted to the frame end in junctions, where axially continuing structures are connected to the frame end at the junctions.

According to an exemplary embodiment of the disclosure, a cast end shield reaches the axially stiff sections of the frame of the electrical machine. Examples of such sections include the respective end junctions of a roof plate, side plates, a bottom plate, and oblique support plates. This means that the end shield not only covers the stator opening, but also can increase the combined stiffness of the end and the end shield, which can improve the stiffness of the bearing support.

The reach of the cast end plate to the axially stiff parts of the frame of the electrical machine can be increased by increasing the radial dimension of the brackets. A bracket can be formed from a fastener, for example, which protrudes to the axial direction from the outer edge of the end plate, forming a bracket.

The arrangement and electrical machine according to an exemplary embodiment of the disclosure utilize the frame end structures of the electrical machine. Existing end junctions are utilized, where axially continuing structures are connected to the end. Axially continuing structures are also fittable to the end, such as U-shaped reinforcements fitted to the frame sides and roof.

In an exemplary embodiment of the disclosure the further rim includes reinforcements in the radial direction, protruding in the axial direction and connecting to the brackets. The reinforcements can be formed by casting, and they can increase the bending stiffness.

In an exemplary embodiment of the disclosure, a ring at least partially surrounding the bearing surrounds the opening. At least three reinforcements are connected to the ring surrounding the bearing. The cross section of the reinforcements can be substantially U-shaped.

The sidewalls of the U-shaped reinforcement are joined during the casting of the end shield to the surface of the further rim.

The bearing installed in the end shield is supported at the point of intersection of a lattice formed by stiff reinforcements. The reinforcements can be attached to a stiff ring at the point of intersection of the lattice, and this ring can provide a good base for fixing both rolling contact bearings and slide bearings.

According to an exemplary embodiment of the disclosure, the bottom of the end shield extends to the junction of the frame end and the bottom plate. This means that the bottom of the end shield includes no brackets. When the angular point is located in the center point of the end shield, the sides of an angle of at least 150° limit a bracketless section in the end shield.

According to an exemplary embodiment of the disclosure, the end shield can include four brackets, two of which are fittable to the junction of the end and the roof plate. Such a solution is desirable when the roof plate includes openings hampering the essential axial continuity of the roof plate.

According to an exemplary embodiment of the disclosure, the bracket is made of solid material.

According to an exemplary embodiment of the disclosure, the width of the reinforcement, measured in the direction of the circumference, changes when moving in the radial direction. In a cast structure, the U profile allows moving material away from the neutral plane, thus maximizing the efficiency of material in creating stiffness.

According to an exemplary embodiment of the disclosure, an additional reinforcement is attached to the ring surrounding the bearing. The additional reinforcement reaches the outer ring of the end shield. The cross-section of the reinforcements can be substantially U-shaped, solid or flat.

According to an exemplary embodiment of the disclosure, three brackets can be on the same side of the centerline dividing the end shield in two. This can leave more space for bearing connections. This is desirable when the rotor shaft is supported with a side flange bearing or a center flange bearing.

According to an exemplary embodiment of the disclosure, the axial height of the bracket can be substantially equal to or larger than the axial height of the outer edge of the end shield at the bracket. The height of the bracket can affect its bending stiffness, for example, the bending stiffness of the bracket increases along with the height of the bracket.

According to an exemplary embodiment of the disclosure, the frame end of the electrical machine can be a flat plate. The planar frame end can be installed substantially perpendicular to rotor shaft. The shape of the frame end can be rectangular, for example. The entire frame can also be a housing formed of plates. The housing formed of plates can be lightweight and includes a simple structure, which means that its production costs can be low.

According to an exemplary embodiment of the disclosure, axially continuing structures include at least the roof plate of the frame, the side plates and the bottom plate. The use of the axially continuing structures already formed by the frame can reduce the need for additional axial reinforcements for the frame, and space inside the frame can be freed for connecting, installation and maintenance.

Another example of an axially continuing structure is a support plate located inside the frame and connected to the end, at least to the next transversal wall in the axial direction.

According to an exemplary embodiment of the disclosure, the electrical machine can be a two-pole stiff-shaft electrical machine.

The end shield and the arrangement in the electrical machine can be suitable for use in many different electrical machines and electrical machine solutions. A stiff and lightweight shield and a stiff frame end have particular advantages in certain types of machines, such as, for example, vertically installed electrical machines in which the shaft line is vertical and the end shield bears the mass of the rotor in the axial direction, two-pole machines in which axial resonances of the motor end have to be controlled, stiff-shaft machines in which the critical rotational speed should be kept above the operating speed, variable-speed drives in which the axial frequencies of the motor end should be kept outside substantial excitation frequency ranges, electrical machines which have rolling bearings and in which shield vibrations established by the bearing bypass frequencies are being controlled.

Figure 5:
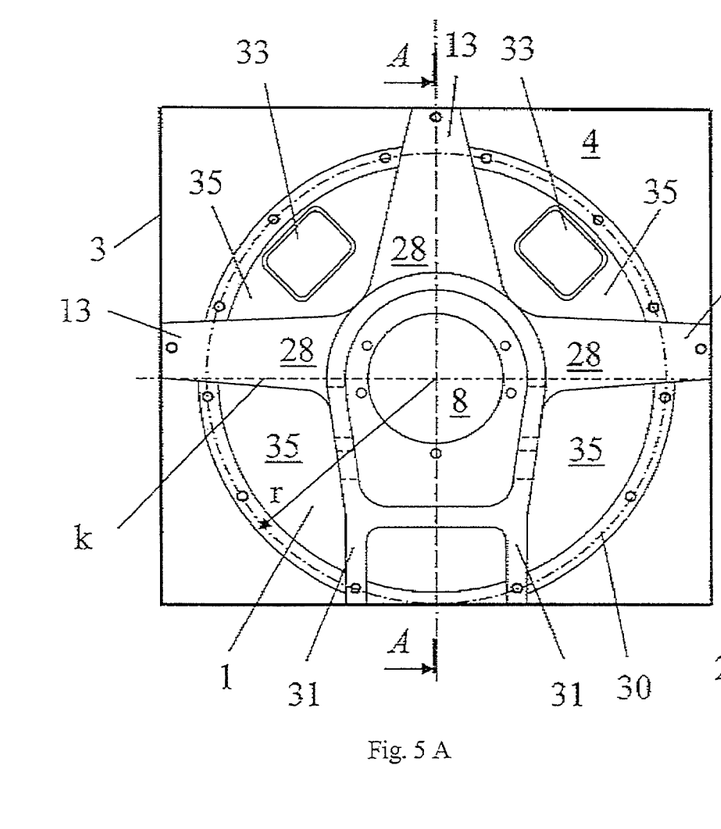
FIGS. 5a-5c illustrate an end shield at the end of an electrical machine according to an exemplary embodiment of the disclosure.
Figure 6:
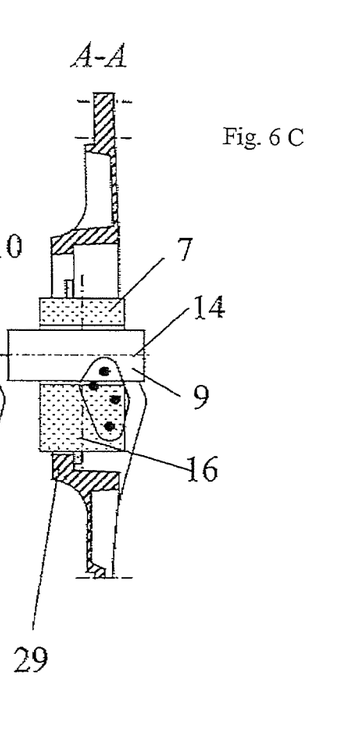
FIGS. 6a-6c illustrate an end shield at the end of an electrical machine according to an exemplary embodiment of the disclosure.
Figure 7:
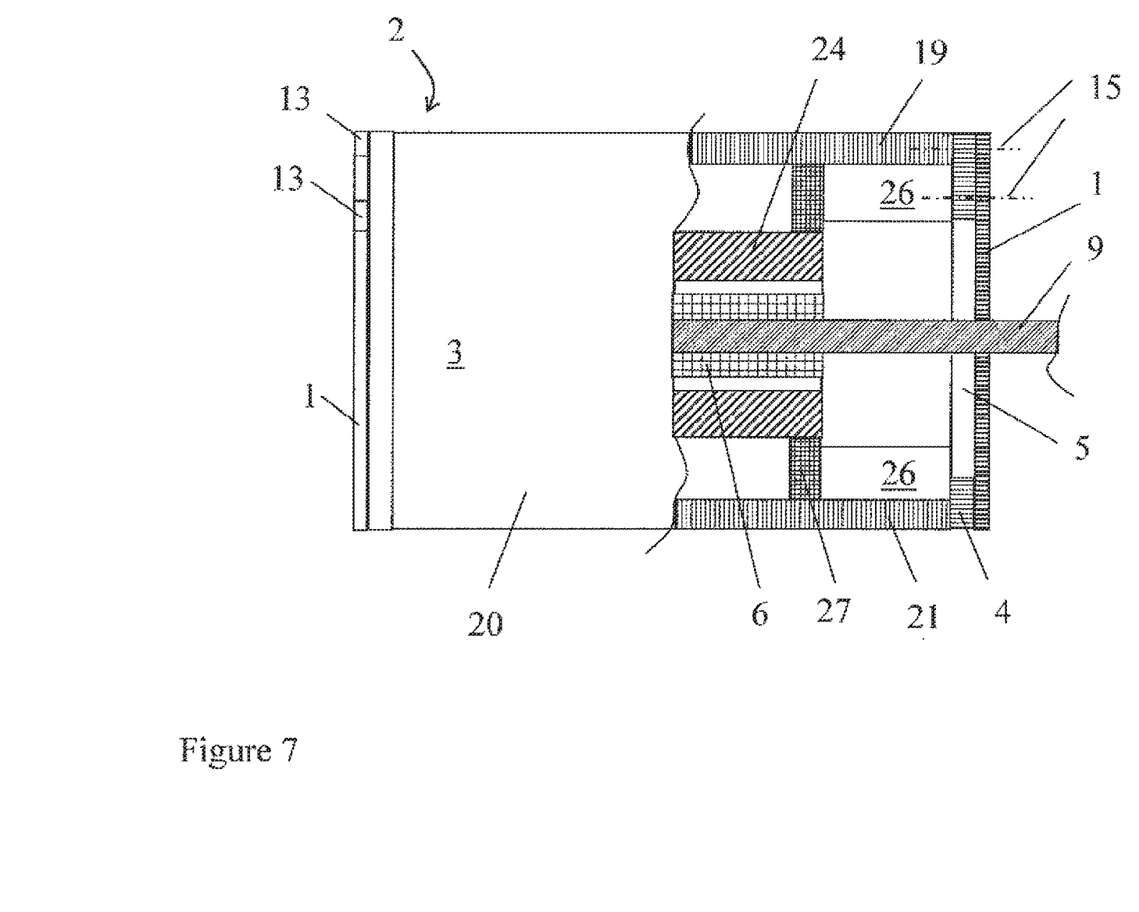
FIG. 7 illustrates the cross section of an electrical machine according to an exemplary embodiment of the disclosure.

FIGS. 1 to 6 illustrate exemplary embodiments of cast end shields for an electrical machine according to the disclosure, and FIG. 7 illustrates an electrical machine according to an exemplary embodiment of the disclosure.

The end shields 1 illustrated in the figures are one-piece end shields. The structural features of the end shields 1 can be formed by casting. The end shields can be made of cast steel, cast iron or cast aluminum alloy, for example. The joint surfaces of the end shields involving desired precision can have machined surfaces. The electrical machine can be, for example, a two-pole stiff-shaft electrical machine.

Figure 1:
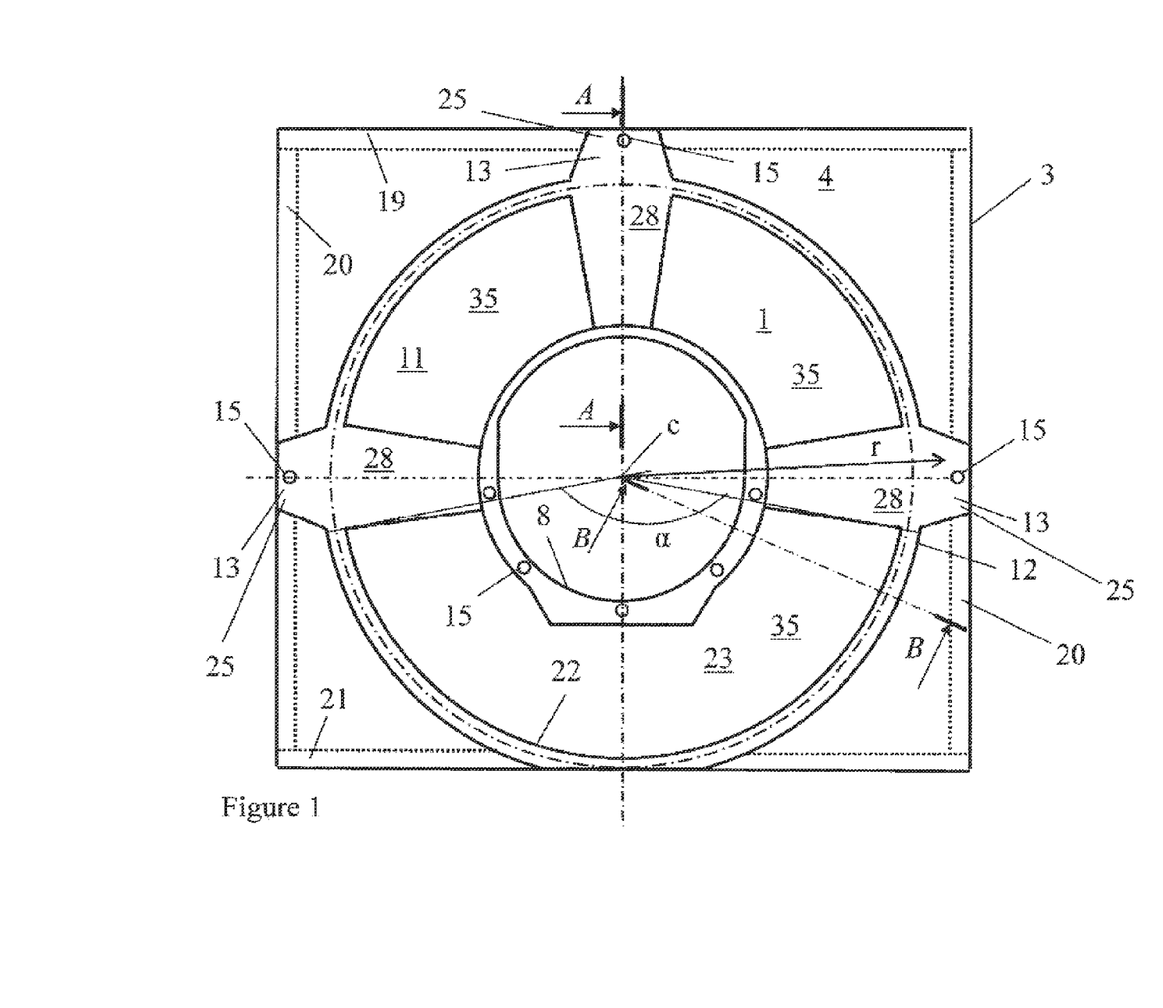
FIG. 1 illustrates an end shield at the end of an electrical machine according to an exemplary embodiment of the disclosure.

In the FIGS. 1-7, a cast end shield 1 closes a stator opening 5 formed in the end 4 of the frame 3 of an electrical machine 2. The end shield 1 supports a bearing 7 that supports the rotor 6. The end shield 1 includes an opening 8 in the middle for the shaft 9 and bearing 7 of the rotor. The end shield includes a nominal center point "c." In the radial direction "r", the end shield 1 includes an inner rim 10, limited by an opening 8, and a further rim 11 connecting to the inner rim. The further rim 11 extends up to the outer edge 12 of the end shield. The radial direction "r" refers to a direction from the center of the end shield 1 toward the outer edge 12 of the end shield 1 as shown in FIG. 1.

On the outer edge 12 of the rim 11, the end shield 1 includes three brackets 13 which protrude from the outer edge 12 in the radial direction "r" and which are fittable to the end 4. The further rim 11 includes reinforcements 28 in the radial direction "r," protruding in the axial direction and connecting to the brackets 13.

Figure 2:
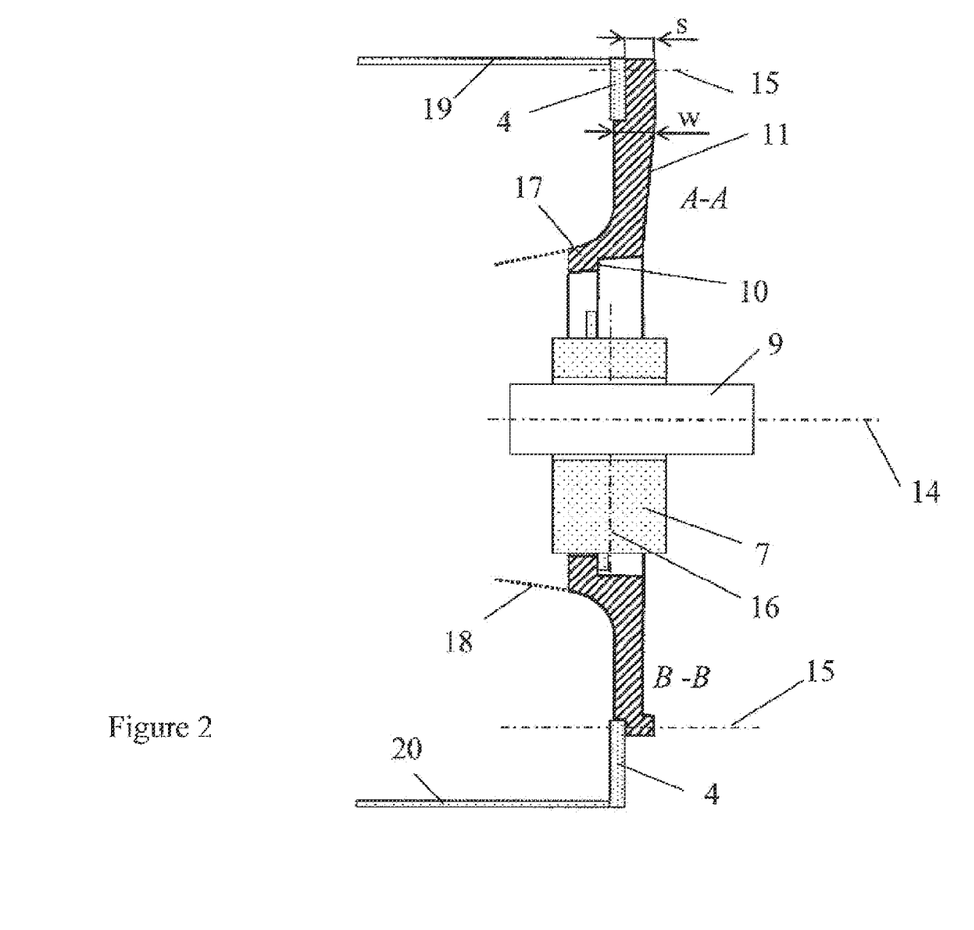
FIG. 2 illustrates a cross-section of FIG. 1.
Figure 3:
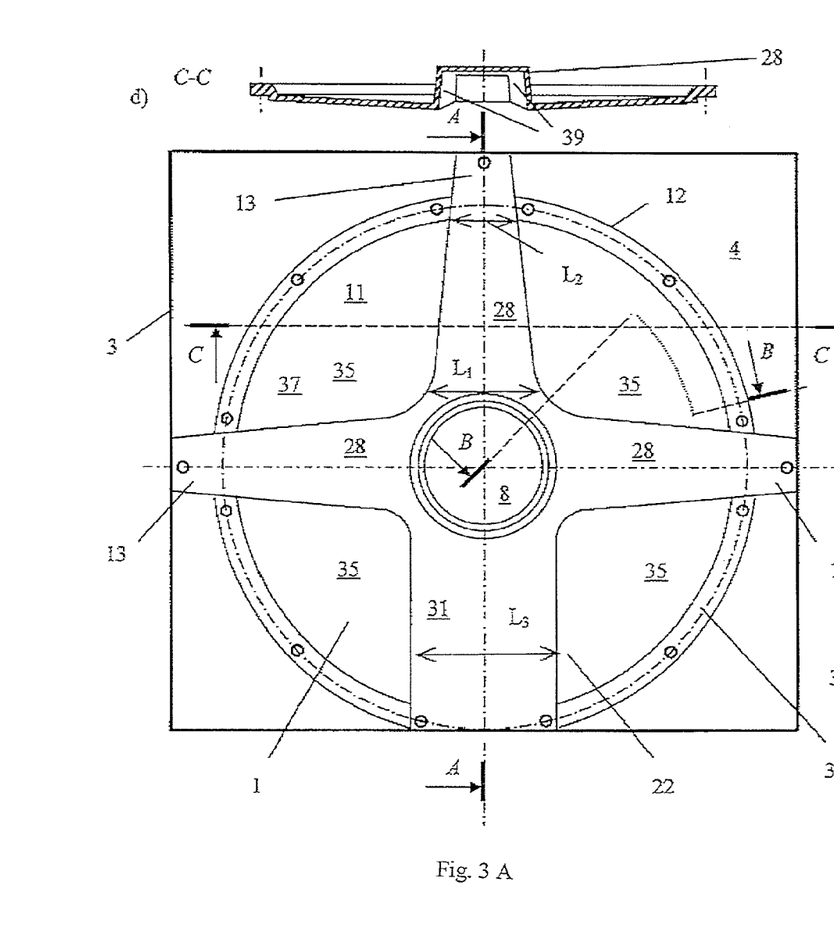
FIGS. 3a-3d illustrate an end shield at the end of an electrical machine according to an exemplary embodiment of the disclosure.
Figure 4:
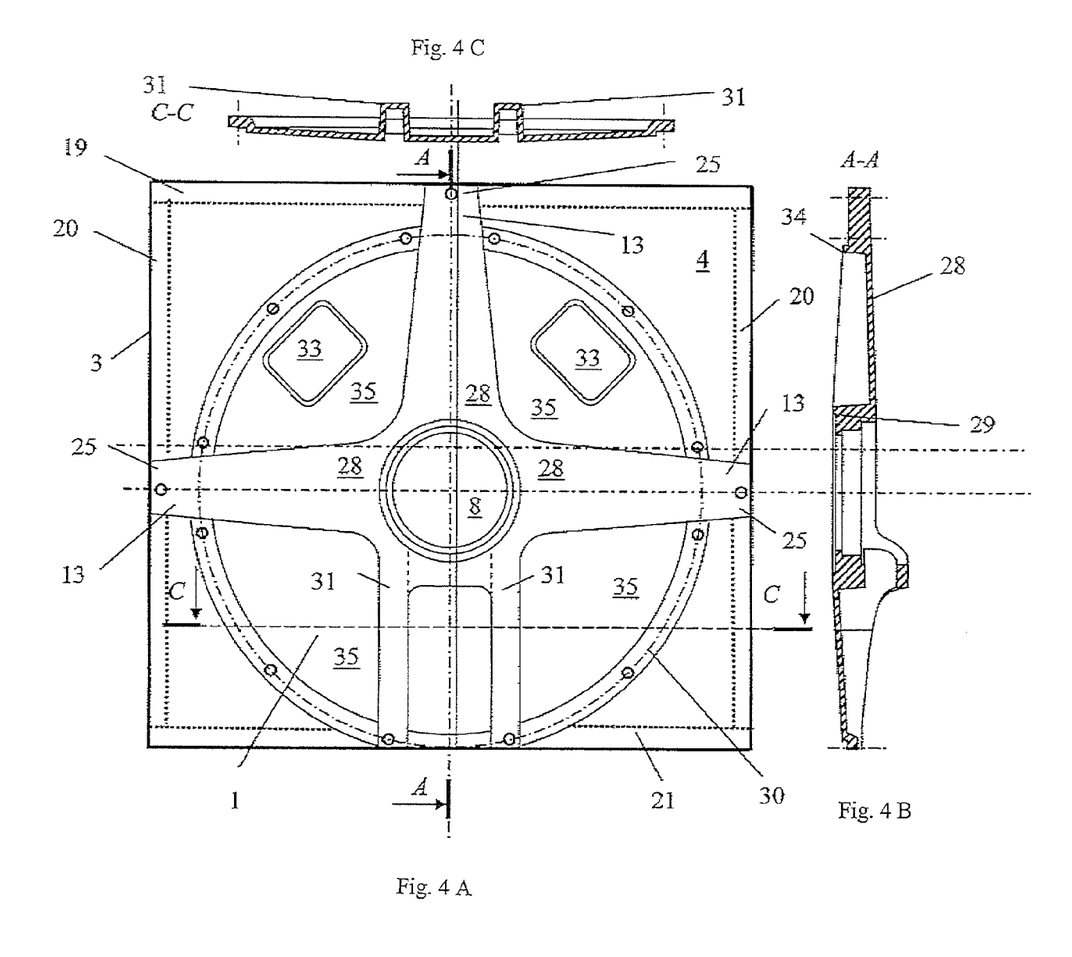
FIGS. 4a-4c illustrate an end shield at the end of an electrical machine according to an exemplary embodiment of the disclosure.

In FIGS. 1 and 2 the reinforcement 28 is formed by increasing the axial thickness "w" of the end shield 1 at the reinforcement. The axial thickness "w" of the further rim 11 of the end shield 1 is larger at the reinforcements 28 than in the rim sections 35 between the reinforcements.

In FIGS. 3-7 the cross-section of the reinforcements 28 is U-shaped. The sidewalls 39 of the U-shaped reinforcement 28 are joined during the casting of the end shield 1 to the surface 35 of the further rim 11. The reinforcements 28 are inseparable parts of the end shield 1.

The reinforcements 28 and the surface of the further rim 11 create a stiff part to the end shield 1.

The flat surfaces 35 of the further rim 11 are left on the end shield 1 between the reinforcements 28. They provide free space for the inspection and maintenance openings 33 or for installing bearing accessories, for example. The axial dimension "$h_1$" of surfaces 35 between the reinforcements 28 is smaller than the axial dimension "$h_2$" of reinforcements 28. The axial dimension h1 of surfaces 35 between the reinforcements 28 is smaller than the axial dimension h2 of reinforcements 28.

The inner surface 38 of the end shield 1 sits against the end 4 of frame 3 of the electrical machine 2. The outer surface 37 of the end shield 1 is pointed away from the end 4 of the frame 3, and reinforcements 28 protrude from the outer surface 37.

The outer edge 12 of the end shield 1 can be substantially circular. The end shield 1 extends up to the bottom of the electrical machine 2 and avoids the floor at the position of the straight section made in the bottom of the end shield.

The reinforcement 28 reaches the outer ring 30 of the end shield 1. The reinforcement 28 reaches the inner edge 34 of the outer ring 30 of the end shield 1. The inner edge 34 of the outer ring 30 is closer, in the radial direction, to the opening 8 than the outer edge 12 is. The outer ring 30 refers to the bolt fixing circle in the end shield 1. The bolt fixing circle must have a bigger diameter than the stator opening 5 in order to allow fixing the end shield 1 to the end 4.

In the Figures, the outer ring 30 of the end shield 1 reinforces the combined bolt and fit joint between the frame 3 and the end shield 1. The end shield 1 is fixed to the end 4 at its outer ring 30 and the brackets 13 using fastener 15.

The width of the reinforcement 28, measured in the direction of circumference, changes in radial direction "r." In the FIGS. 3-6 the width $L_1$, $L_2$ of the reinforcement 28, measured in the direction of circumference, decreases in the radial direction "r" when moving from the opening 8 to the outer ring 30. The width $L_2$ of the reinforcement 28, measured in the direction of circumference, is smaller at the inner edge of the outer ring 30 of end shield 1 than width $L_1$ of the reinforcement 28, measured in the direction of circumference, at the connection point of cylindrical ring 29.

The widths $L_1$, $L_2$, measured in the direction of circumference, of different reinforcements 28 in the end shield 1 may differ from each other. In FIG. 5a, for example, the width $L_1$ of reinforcement 28 opposite to the additional reinforcements 31 on the other side of the opening 8, measured in the direction of circumference at the connection point of the cylindrical ring 29, is smaller than the corresponding width of the other reinforcements 28.

The brackets 13 can be fixed to the end 4 using a fastener. In the figures, the end shield 1 can be fixed to the end 4 of the frame 3 using the fixing bolts 15. The brackets 13 can be made of solid material.

The bearing 7 is supported at the intersection of the lattice formed by the stiff reinforcements 28 where the reinforcements 28 are connected to the ring 29 surrounding the bearing. The ring 29 provides a good base for fixing both rolling contact bearings and the slide bearings 7.

One or more additional reinforcements 31 are connected to the ring 29. The additional reinforcements can increase the total stiffness of the end shield 1. An additional reinforcement 31 reaches the outer ring 30. The additional reinforcement 31 has no fastener 36 protruding from the outer edge 12 of the end shield 1 in radial direction "r" forming bracket 13 that would provide a possibility for fixing to the end 4. The cross-section of the additional reinforcement 31 is substantially U-shaped, solid or flat.

The reinforcements 28 can also be placed, for example, so that the three brackets 13 of fasteners 36 connected to the reinforcements 28 are on the same side of the centerline "k" that divides the end shield 1 into two. In FIGS. 5 and 6, the horizontal reinforcements 28 are above the centerline "k" of the end shield.

The end shield can include three brackets 13. The brackets are formed to smoothly connect to the end shield 1 so that the bending stiffness transfers onto the side of end shield 1. The brackets 13 are bar-like and can be short in the radial direction "r." The bending stiffness of the bracket 13 can be equal to or higher than that of the end shield 1, when considering an equally wide section of the end shield.

The use of the axially continuing structures already formed by the frame can reduce the need for additional axial reinforcements for the frame, and space inside the frame can be freed for connecting, installation and maintenance.

FIGS. 1 and 2 illustrate the structure of a cast end shield 1 for a centre-flange journal bearing 7. The end shield 1 includes an opening 8 in the middle with a centre-flange journal bearing 7 and a rotor shaft 9 installed into it. The opening 8 can be partially circular. The opening 8 can be divided into an upper part and a lower part by a line that is horizontal against the axial line 14 of the rotor. The lower part of the opening 8 can be semicircular. With a centre-flange journal bearing 7, the bearing is attached to the end shield 1 only by the lower half, which is attached by bolt mounting 15 onto an attachment surface at the lower part of the opening 8. Further space shall be reserved in the opening 8 for installation, which makes the upper half of the opening 8 oval. The opening 8 can be symmetrical in relation to the vertical axis against the axial line 14 of the rotor.

In the radial direction "r" from the centre "c" of the shield at the axial line 14 of the rotor, the end shield is divided into an inner rim 10, limited by the opening 8, and a rim 11. The inner rim 10 is limited by the rim 11, which means that the rims can form a uniform piece.

The bearing is moved towards the electrical machine 2 by embedding the bearing attachment surface axially closer to the electrical machine 2. The embedding reduces the bearing span of the electrical machine 2 that is measured from the middle surface 16 of the bearing. At the position of the winding ends, the inner surface of the end shield 1 extends to the surface 18 determined by the winding ends and the air insulation gap. The inner rim 10 of the end shield protrudes towards the electrical machine at the position of a projection cast inside it, the reinforcement ring 17, forming a high conical/cylindrical surface.

The axial height "s" of the bracket 13 is equal to or larger than the axial height "w" of the outer rim 12 at the bracket 13.

The brackets 13 of the end shield 1 are fitted with fasteners 15, for example, bolt mounting to end 4. The junctions 25 are axially stiff sections of the end plate 4. The axial stiffness can result from the end plate 4 being connected to the electrical machine's axial roof plate 19 and to the axial side plates 20. With the brackets 13, the support of the end shield 1 is transferred to the axially stiff sections of the frame 3. Thus, the end shield 1 is supported axially with the brackets 13. The roof plate 19, the side plates 20 and the bottom plate 21 behind the end plate 4 are marked with a broken line.

FIGS. 3a-3d illustrates the end shield 1 for a rolling contact bearing. The end shield 1 has a round opening 8 in the middle for the shaft 9 and the rolling contact bearing 7 of the rotor 6. The opening 8 is surrounded by a stiff cylindrical ring 29 that surrounds the bearing. The cylindrical ring 29 has three stiff reinforcements 28 and one additional reinforcement 31 connected to it. The cross-section of the reinforcements 28 and the additional reinforcement 31 is U-shaped.

The reinforcements 28 have a fastener 36 connected to them at the outer ring 30. The fastener 36 protrudes from the outer edge 12 of the end shield 1 in radial direction "r," forming bracket 13. The fastener 36 and its bracket 13 are made of solid material.

The width $L_3$ of the additional reinforcement 31, measured in the direction of circumference, is substantially constant when moving in radial direction "r." The width $L_3$ of the additional reinforcement 31, measured in the direction of circumference, is greater than the width $L_1$, $L_2$ of reinforcements 28 measured in the direction of circumference.

The end shield 1 is symmetrical in relation to a plane formed by the axial line 14 of the rotor and a vertical line perpendicular to it.

FIGS. 4a-4c illustrates the end shield 1 for a rolling contact bearing.

The opening 8 is surrounded by a stiff cylindrical ring 29 surrounding the bearing. The cylindrical ring 29 has three stiff reinforcements 28 and two additional reinforcements 31 connected to it. There is a grease tray in conjunction with the end shield 1.

The downward-pointing additional reinforcements 31 can, for example, be implemented using bars with U-shaped or flat cross-sections. The end shield 1 has two inspection and maintenance openings 33 on the surfaces 35 between the reinforcements 28.

The brackets 13 of the end shield 1 are fitted onto the end 4 using the bolts 15. The junctions 25 are axially stiff points of the end plate 4. The end plate 4 is connected at junctions 25 to the axial roof plate 19 and axial side plates 20 of the electrical machine. The roof plate 19, side plates 20 and bottom plate 21 are shown with a dashed line.

FIGS. 5a-5c illustrates the end shield 1 for a side flange slide bearing 7. The downward-pointing additional reinforcements 31 have flat cross sections. The oil and sensor connections of the slide bearing 7 are led through the reinforcement 28 via the connection holes 32 in them. The horizontal reinforcements 28 are above the end shield centerline "k," leaving space for the connections of bearing 7.

FIGS. 6a-6c illustrate the structure of the cast end shield 1 for a centre-flange bearing 7. The end shield 1 includes the opening 8 in the middle with the centre-flange bearing 7 and the rotor shaft 9 installed into it. The opening 8 can be partially round. The lower part of the opening 8 can form a half circle. With the centre-flange bearing 7, the bearing can be attached to the end shield 1 only by the lower half, which is attached by fastener 15, for example, bolt 12, onto an attachment surface at the lower part of the opening 8. Further space shall be reserved in the opening 8 for installation, which makes the upper half of the opening 8 oval. The opening 8 can be symmetrical in relation to the vertical axis against the axial line 14 of the rotor. The center point "c" of the end shield is on the shaft line 14 of the rotor.

The downward-pointing reinforcements 28 are flat profiles. The oil and sensor connections of the slide bearing 7 are led through the reinforcement 28 via the connection holes 32 in them.

The horizontal reinforcements 28 are above the end shield centerline k, leaving space for the connections of bearing 7.

FIG. 7 illustrates an electrical machine. The frame 3 of the electrical machine 2 is manufactured of plates, and it is a housing formed of plates. The bending stiffness of the plate is proportional to the power of three of its thickness, which means that the frame end 4 made of the plate is very flexible. The frame end plate 4 is not axially stiff because it is a cross-directional structure. The frame end plate 4 made of the plate is easy to implement in terms of manufacturing technique.

In the assembly of the electrical machine 2, a ready stator 24 is installed inside the frame 3 of the electrical machine through the stator opening 5. The frame 3 surrounds the outer surface of the stator. The rotor 6 is installed inside the stator 24. The rotor 6 is supported to the bearing 7 in the stator opening 5. Between the rotor 6 and the stator 24, there is an air gap so that the rotor 6 may rotate freely. The bearings 7, which can be rolling or slide bearings, are fitted onto the end shields 1 which support the rotor 6. The end shield 1 covers the stator opening 5 of the frame 3.

The brackets 13 of the end shield 1 are fitted onto the junctions 25 of structures continuing axially to the end 4. There are oblique support plates 26 inside the frame 3. The support plates 26 connect to the end 4 and to the next wall, the stator support flange 27, in the axial direction, viewed from the end, located cross-directionally with respect to the shaft 9. The oblique support plates 26 are installed to the corners of the frame 3 so that the support plate 26 in the upper part of the frame 3 is connected to the roof plate 19 and to the side plate 20, and the support plate 26 in the bottom of the frame 3 is connected to the bottom plate 21 and to the side plates 20. Two brackets 13 are fitted onto the junctions of the end 4 and the support plates 26. A third bracket 13 is fitted onto the junction of the end 4 and the roof plate 19.

The two brackets 13 of the fastener 36 of the end shield 1 are located in sections where the frame 3 includes axially stiff support. For example, if the roof plate 19 includes openings behind the end 4 in the middle for cooling air circulation, the roof plate 19 is not an substantial axially continuing structure in that section. The side plates 20 may also have openings for connection boxes. An axially continuing structure, the plate 19-21 is substantially continuing when its opening's distance from the end 4 is larger than or equal to the opening's dimension in the circumferential direction.

If the roof plate 19 includes openings, the frame 3 is flexible in this section. In that case, it is desirable to use four brackets 13 in the end shield, two of the brackets 13 are fitted onto the junction of the end 4 and the roof plate 19. The junctions 25 are selected so that the openings remain between the junctions 25.

Also in the junctions of the side plates 20 and the end 4, it is desirable to choose the junction 25, where the plate is an substantially axially continuing structure.

There is a bracketless outer edge in the bottom 22 of the end shield. The bracket 13 is not needed for the bottom 22, because the end shield 1 is fitted so that part of the bracketless sector 23 of the end shield 1 extends up to the junction of the end 4 and the bottom plate 21. The bracketless sector 23 is formed of 100-170° angle α, for example, 150-170° angle α.

The disclosure is described above with the help of certain embodiments. However, the description should not be considered as limiting the scope of patent protection. The embodiments of the disclosure may vary within the scope of the following claims.

Parts list: 1 end shield, 2 electrical machine; 3 frame; 4 end; 5 stator opening; 6 rotor; 7 bearing; 8 opening; 9 shaft; 10 inner rim; 11 rim; 12 outer edge; 13 bracket; 14 shaft line; 15 bolt attachment; 16 center surface; 17 reinforcement ring; 18 air insulation surface; 19 roof plate; 20 side plate; 21 bottom plate; 22 bottom; 23 sector; 24 stator; 25 junction; 26 support plate; 27 support flange; 28 reinforcement; 29 ring; 30 outer ring; 31 additional reinforcement; 32 connection opening; 33 inspection and maintenance opening; 34 inner edge; 35 surface; 36 fastener; 37 outer surface; 38 inner surface; 39 sidewall; c center point; $h_1$ height; $h_2$ height; k centre line; $L_1$ width; $L_2$ width; $L_3$ width; r radial direction; s height; w height; α angle.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A cast end shield configured for an electrical machine, for closing a stator opening formed in an end of a frame of the electrical machine and for supporting a bearing that is to support a rotor, the end shield comprising:
   an opening in a middle for a bearing supporting a shaft of a rotor;
   an inner rim limited by the opening;
   a further rim connecting to the inner rim, the further rim extending up to an outer edge of the end shield; and
   at least three brackets protruding smoothly from the outer edge of the end shield in a radial direction for transferring a bending stiffness to a side of the end shield, the brackets being fitted for an electrical machine frame end, wherein the opening for the bearing, and a plane perpendicular to the shaft and passing through a face of the at least three brackets configured to be facing the electrical machine, are arranged to be co-planar.

2. The end shield according to claim 1, wherein the further rim comprises:
   reinforcements in the radial direction, protruding in an axial direction and connecting to the brackets.

3. The end shield according to claim 2, comprising:
   a ring for at least partially surrounding a bearing and surrounding the opening; and
   at least three reinforcements connected to the ring that is to surround the bearing, the cross-section of the reinforcements being substantially U-shaped.

4. An end shield according to claim 3, wherein sidewalls of the reinforcements are joined during a casting of the end shield to a surface of the further rim.

5. The end shield according to claim 2, wherein sidewalls of the reinforcement are joined during a casting of the end shield to a surface of the further rim.

6. The end shield according to claim 2, wherein a width of the reinforcements, measured in a direction of circumference, changes in the radial direction.

7. An end shield according to claim 2, wherein the end shield includes a bracketless sector, the sector formed of an angle (α) of at least 150°.

8. The end shield according to claim 1, wherein the end shield includes a bracketless sector, the sector formed of an angle (α) of at least 150°.

9. The end shield according to claim 1, wherein the bracket's axial height (s) is equal with or larger than an axial height (w) of an outer edge at the bracket.

10. The end shield according to claim 1, wherein the brackets are made of solid material.

11. The end shield according to claim 1, comprising:
    an additional reinforcement attached to a ring that is to at least partially surround a bearing, wherein the additional reinforcement reaches the outer ring of the end shield, and a cross-section of the additional reinforcement is substantially U-shaped, solid or flat.

12. The end shield according to claim 1, wherein three brackets are on a same side of a centerline (k) dividing the end shield into two.

13. An electrical machine, comprising:
a rotor for rotating around a shaft;
a stator spaced from the rotor at an air gap;
a frame around an outer surface of the stator, a stator opening being formed in an end of the frame;
a cast end shield for closing the stator opening wherein the end shield comprises:
an opening in a middle for a bearing supporting the shaft, the opening being surrounded by a ring that is to at least partially surround the bearing; and
at least three brackets protruding smoothly from an outer edge of the end shield for transferring a bending stiffness to a side of the end shield, the brackets being fittable onto end junctions where axially continuing structures are connected to the frame end at the junctions, wherein the opening for the bearing, and a plane perpendicular to the shaft and passing through a face of the at least three brackets facing to the electrical machine, are arranged to be co-planar.

14. The electrical machine according to claim 13, wherein the end of the frame includes a flat plate.

15. The electrical machine according to claim 13, wherein the frame is a housing formed of plates.

16. The electrical machine according to claim 15, wherein the axially continuing structures comprise:
a roof plate;
a side plate; and
a bottom plate.

17. The electrical machine according to claim 16, wherein part of a bracketless sector of the end shield is on a junction of the frame end and the bottom plate.

18. The electrical machine according to claim 15, wherein the end shield, comprises:
four brackets, two of the brackets being fitted onto the junction of the frame end and a roof plate.

19. The electrical machine according to claim 13, wherein the brackets are fitted onto the junction of the frame end and a support plate, and the support plate connects to a next cross-directional wall in the axial direction.

20. The electrical machine according to claim 13, wherein the end shield comprises:
at least three reinforcements connected to the ring that is to surround the bearing, a cross section of the reinforcements being substantially U-shaped, and the reinforcements reaching the outer ring of the end shield, and the reinforcements connecting to a fastener in the outer ring, and the fastener forming a bracket.

* * * * *

UNITED STATES PATENT AND TRADEMARK OFFICE
CERTIFICATE OF CORRECTION

PATENT NO.       : 9,018,827 B2
APPLICATION NO.  : 13/409149
DATED            : April 28, 2015
INVENTOR(S)      : Timo Holopainen et al.

It is certified that error appears in the above-identified patent and that said Letters Patent is hereby corrected as shown below:

Title Page, Please insert

-- (30) Foreign Application Priority Data

September 1, 2009    (FI).................................20095895

October 2, 2009      (FI).................................20096011 --

Signed and Sealed this
Eighth Day of September, 2015

Michelle K. Lee
*Director of the United States Patent and Trademark Office*